(12) United States Patent  (10) Patent No.: US 8,315,508 B2
Nakasato  (45) Date of Patent: Nov. 20, 2012

(54) INTER-GOP MANAGEMENT APPARATUS (75) Inventor: Kouta Nakasato, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 799 days.

(21) Appl. No.: 12/425,954

(22) Filed: Apr. 17, 2009

(65) Prior Publication Data

US 2009/0257731 A1  Oct. 15, 2009

Related U.S. Application Data (63) Continuation of application No. PCT/JP2006/322851, filed on Nov. 16, 2006.

(51) Int. Cl.
*H04N 5/917* (2006.01)
(52) U.S. Cl. ........................................ 386/329
(58) Field of Classification Search ............... 369/47.13; 386/232, 240–252, 329–344
See application file for complete search history.

(56) References Cited

U.S. PATENT DOCUMENTS

| 6,584,120 B1 | 6/2003 | Shiomoto et al. |
| 7,106,946 B1 | 9/2006 | Kato |
| 2002/0164152 A1 | 11/2002 | Kato et al. |
| 2004/0234247 A1 | 11/2004 | Nakashika et al. |
| 2006/0222339 A1* | 10/2006 | Kim et al. ............... 386/95 |
| 2007/0071415 A1* | 3/2007 | Yahata et al. ............ 386/112 |
| 2007/0092218 A1* | 4/2007 | Nakashika et al. ...... 386/95 |
| 2009/0097821 A1* | 4/2009 | Yahata et al. ........... 386/95 |

FOREIGN PATENT DOCUMENTS

| EP | 1089571 A2 | 4/2001 |
| EP | 1198132 A1 | 4/2002 |
| JP | 11-340938 A | 12/1999 |
| JP | 2001-167528 A | 6/2001 |
| JP | 2002-159004 A | 5/2002 |
| KR | 10-2004-0084866 A | 10/2004 |
| WO | WO-01/82604 A1 | 11/2001 |
| WO | WO 2006/088100 A1 | 8/2006 |

* cited by examiner

*Primary Examiner* — Thai Tran
*Assistant Examiner* — Stephen Smith
(74) *Attorney, Agent, or Firm* — Arent Fox LLP (57) ABSTRACT

A video record/reproduction device provided with an inter-GOP management apparatus includes GOP detection means (15) for monitoring a multiplexed packet output by encoding and multiplexing to detect a packet including a GOP, count means (16) for counting the number of the multiplexed packets, and ATS addition means (17) for adding an ATS (Arrival Time Stamp) to the multiplexed packet. When the packets including the GOP terminate without reaching the number of packets in the predetermined packet units, the time added as the ATS is advanced by the time corresponding to the deficient number of packets.

13 Claims, 7 Drawing Sheets

Related Art

Related Art

INTER-GOP MANAGEMENT APPARATUS

CROSS-REFERENCE TO RELATED APPLICATION

This application is a continuation of Application No. PCT/JP2006/322581, filed Nov. 16, 2006, the disclosure of the prior application is hereby incorporated in its entirety by reference.

TECHNICAL FIELD

The present invention relates to an apparatus and a method for performing inter-GOP (Group Of Picture) management on a multiplexed stream managed in predetermined packet units.

BACKGROUND ART

Recently, video (moving pictures) record/reproduction devices such as a DVD recorder, a PC (Personal Computer) having a recording and regenerating function, a camcorder, etc. that encode, multiplex, record, and regenerate video and audio.

In recording video and audio on the video record/reproduction devices, when a video signal corresponding to video and an audio signal corresponding to audio are input, each signal is encoded, and output as a video stream and an audio stream. A video stream is encoded in, for example, an MPEG (Moving Picture Experts Group) 2 system. The encoded video stream and audio stream is time-division multiplexed, output as a multiplexed stream, and recorded on a record medium.

When the video record/reproduction device is in accordance with the standard of BD (Blu-ray Disc) defined by the BDA (Blu-ray Disc Association), the multiplexed stream is configured by 192 bytes as one packet, and 1 aligned unit is configured by 32 packets (=6144 bytes). Some of these video record/reproduction devices can manage transmitting the header of the GOP as a header of an aligned unit on the GOP boundary in a multiplexed stream to be transmitted. In these devices, when a packet including a GOP being transmitted is terminated without reaching the number of packets (integral multiple of 32) in aligned units, the deficiency is complemented by null packets, and then a packet including the next GOP is transmitted.

Figure 5:
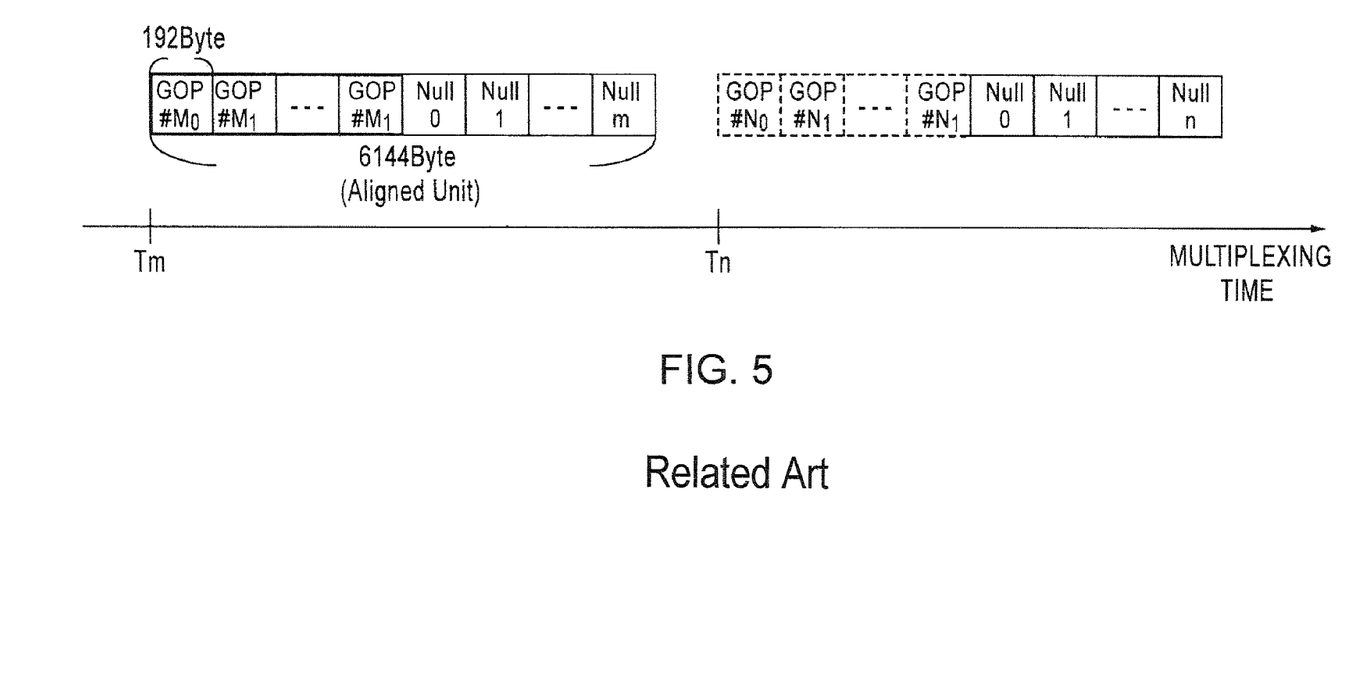
FIG. 5 is a schematic diagram of a transmitted packet in a conventional device.

FIG. 5 illustrates a schematic diagram of a packet transmitted as described above.

As shown in FIG. 5, the packets (GOP#$M_0$, ..., GOP#$M_i$) including a GOP#M being transmitted terminate without reaching 1 aligned unit, the deficiency is complemented by null packets ((Null$_0$, ..., Null$_m$) to guarantee the 6144-byte alignment, and then the packets (GOP#$N_0$, ..., GOP#$N_i$) including the next GOP#N are transmitted. In FIG. 5, since the packet including the GOP#N has also terminated without reaching 1 aligned unit, the deficiency is also complemented by null packets (Null$_0$, ..., Null$_n$).

Actual transmission time (multiplexing time) is inserted as an ATS (Arrival Time Stamp) into each of the transmitted packets. For example, actual transmission time Tm as an ATS is inserted into a packet (GOP#$M_0$) including the header of the GOP#M as the header of an aligned unit, and actual transmission time Tn as an ATS is inserted into a packet (GOP#$N_0$) including the header of the GOP#N as the header of next aligned unit.

Figure 6:
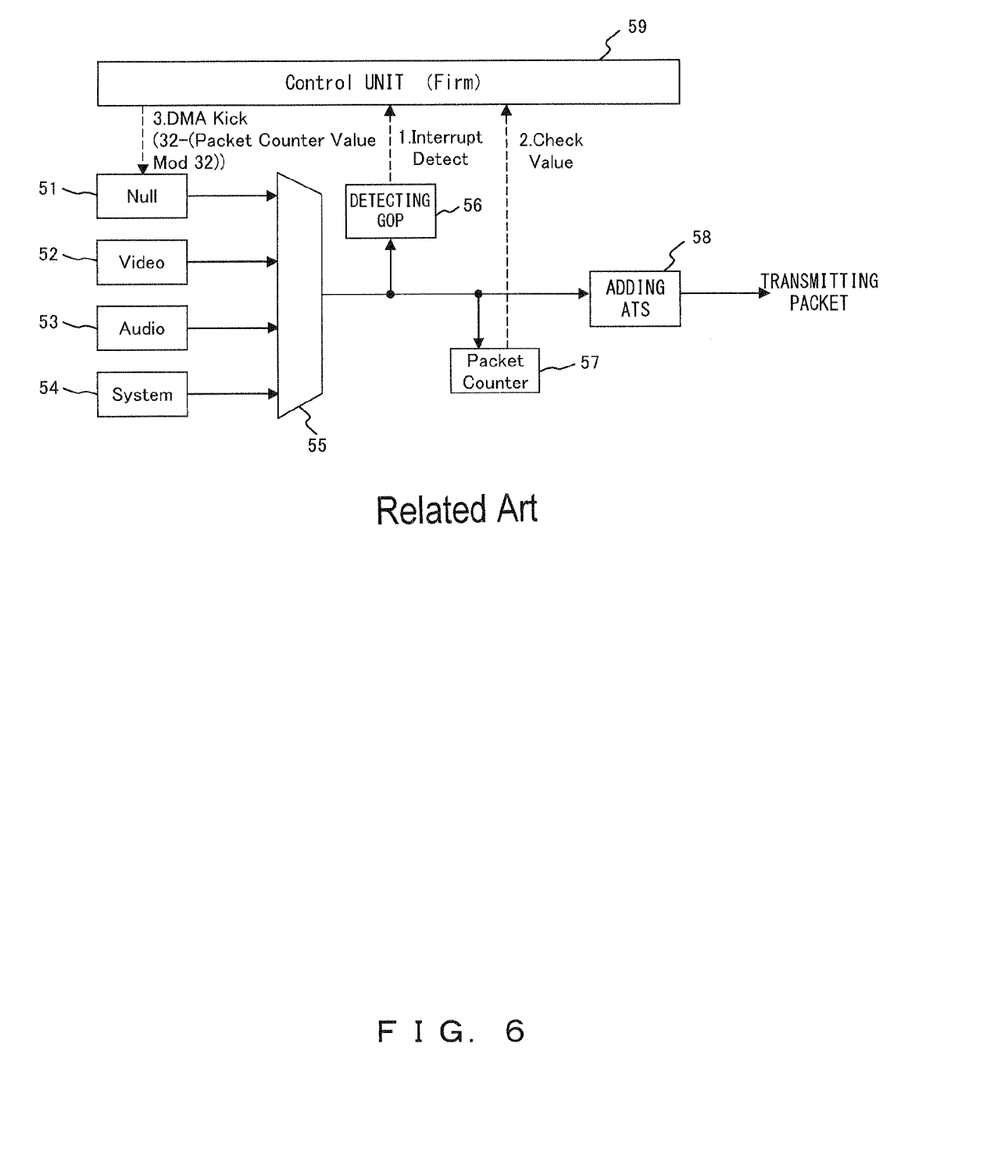
FIG. 6 illustrates an example of the configuration for transmitting a packet in a conventional device.

FIG. 6 illustrates an example of the configuration of transmitting a packet as described above.

In FIG. 6, a null packet generation unit 51 generates and outputs a null packet (unnecessary/insignificant packet) depending on DMA kick by a control unit 59. A video packet generation unit 52 encodes an input video signal in, for example, an MPEG2 format, and generates and outputs a video packet configuring a video stream. An audio packet generation unit 53 encodes an input audio signal in a predetermined format, and generates and outputs an audio packet configuring an audio stream. A system packet generation unit 54 generates and outputs a system packet including time information required in decoding and regenerating a signal. A multiplexing unit 55 time-division multiplexes a null packet, a video packet, an audio packet, and a system packet to generate and output a multiplexed packet (of 188 bytes) configuring a multiplexed stream. A GOP detection unit 56 monitors a packet output from the multiplexing unit 55, and detects a packet including a GOP. A packet counter 57 counts the number of packets output from the multiplexing unit 55. An ATS (Arrival Time Stamp) addition unit 58 adds actual transmission time (multiplexing time) expressed by 4 bytes as an ATS (Arrival Time Stamp) to the header of the packet output from the multiplexing unit 55, and outputs a 192-byte packet configuring a multiplexed stream (transmitting a packet). A control unit 59 is configured by hardware or firmware, and controls the operation of each unit relating to encoding, multiplexing, etc.

With the configuration above, the control unit 59 first controls the video packet generation unit 52, the audio packet generation unit 53, the system packet generation unit 54, and the multiplexing unit 55, and starts outputting packets including the first GOP (for example, a "GOP#M") from the multiplexing unit 55. Then, if it is determined from the detection result of the GOP detection unit 56 monitoring a packet output from the multiplexing unit 55 that a packet including the GOP#M is not detected any more (1. Interrupt Detect), then the counter value of the packet counter 57 (Packet Counter Value) at the time is confirmed (2. Check Value), and it is determined whether or not packets including the GOP#M have terminated without reaching the number of packets in aligned units (packets of a multiple of 32). In the determination, if the value of a packet counter value mod 32 is other than 0, it is determined that the packets including the GOP#M have terminated without reaching the number of packets in aligned units.

The packet counter 57 is configured so that, for example, the counter value is reset to 0 immediately before the packet including the header of the GOP is output from the multiplexing unit 55, and the counter value can be 1 for the packet including the header of the GOP.

If it is determined that the packets including the GOP#M have terminated without reaching the number of packets in aligned units, then the null packet generation unit 51 is controlled (3. DMA Kick (32-(Packet Counter Value Mod 32)) and the multiplexing unit 55 is also controlled to output null packets as the deficiency to fill the number of packets in aligned units. Then, the video packet generation unit 52, the audio packet generation unit 53, the system packet generation unit 54, and the multiplexing unit 55 are controlled again to start outputting packets including the next GOP from the multiplexing unit 55.

In the above-mentioned determination, if the packets including the GOP#M have terminated in the number of packets in aligned units, then the above-mentioned null packets are not output, and the video packet generation unit 52, the audio packet generation unit 53, the system packet generation unit 54, and the multiplexing unit 55 are simply controlled to start outputting the packets including the next GOP from the multiplexing unit 55.

In the subsequent steps, the process is performed similarly.

By repeating the operations, the header of the GOP is transmitted at the header of the aligned unit, and if the packets including the GOP have terminated without reaching the number of packets in aligned units, the deficiency is complemented by null packets. Thus, the GOP management can be performed in aligned units.

Figure 7:
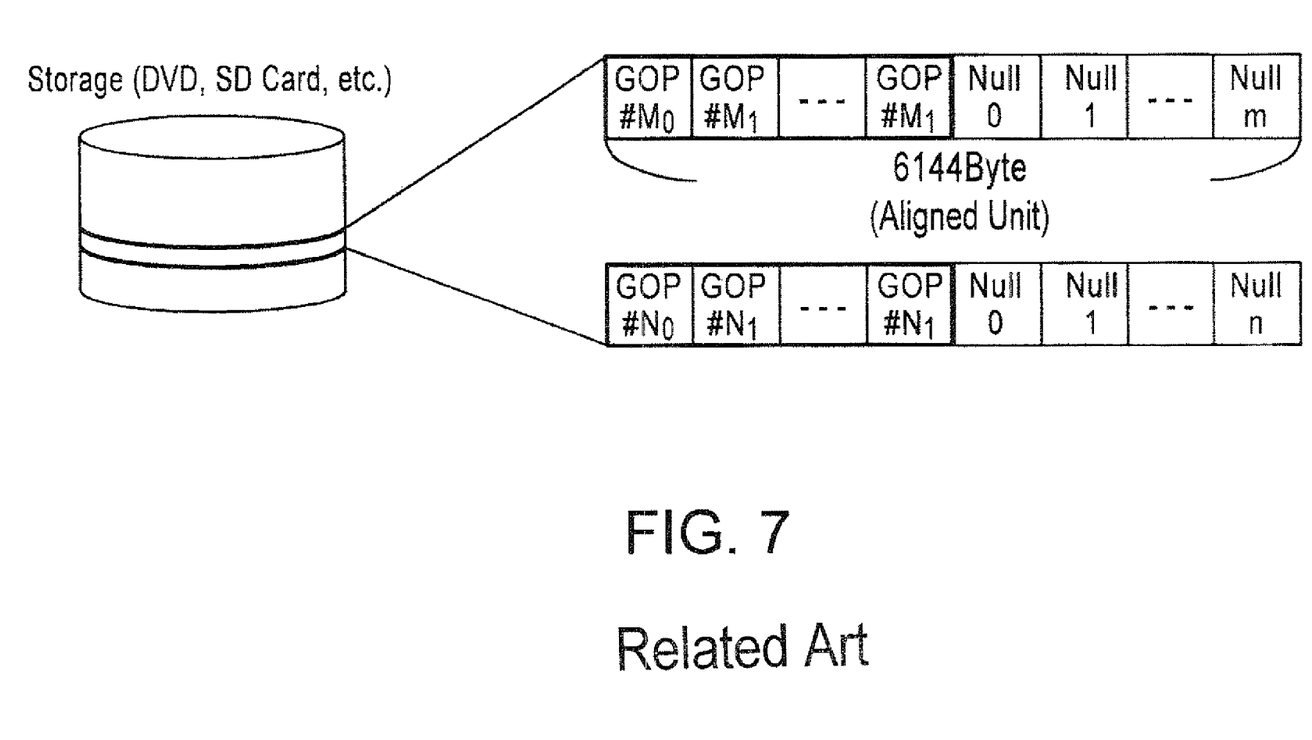
FIG. 7 is a schematic diagram of an example of storing a transmitted packet in storage in a conventional device.

FIG. 7 is a schematic diagram illustrating an example of storing a packet transmitted as described above in storage.

As illustrated in FIG. 7, if a null packet is transmitted when the transmitted packet is stored in storage (for example, a DVD, an SD card, etc.) for each aligned unit, then the null packet is also stored.

An example of the conventional video record/reproduction device is described above with reference to FIGS. 5 through 7, and the technology relating to each technique applied to the device is disclosed in, for example, the patent documents 1,2, 3, etc.

In the conventional video record/reproduction device described above with reference to FIGS. 5 through 7, if the transmitted packet including the GOP has terminated without reaching the number of packets in aligned units, then a null packet is transmitted to perform the inter-GOP management in aligned units. Therefore, the transmission band can be degraded by the transmission of the null packet, or there can be the case that a storage capacity cannot be effectively utilized by the storage of a null portion (null packet) when a multiplexed stream is stored.

The present invention aims at providing an inter-GOP management apparatus and its method capable of effectively using a transmission band only by a necessary packet and storing only a valid portion when a multiplexed stream is stored.

Patent Document 1: Japanese Laid-open Patent Publication No. 2001-167528
Patent Document 2: Japanese Laid-open Patent Publication No. 2002-159004
Patent Document 3: Japanese Laid-open Patent Publication No. 11-340938

DISCLOSURE OF THE INVENTION

The inter-GOP management apparatus according to an aspect of the present invention performs inter-GOP management in a multiplexed stream managed in predetermined packet units, and includes, GOP detection means for monitoring a multiplexed packet output by encoding and multiplexing to detect a packet containing a GOP, count means for counting the number of multiplexed packets, and ATS addition means for adding an ATS (arrival time stamp) to the multiplexed packet. When the packets including the GOP terminate without reaching the number of packets in the predetermined packet units, the time added as the ATS is advanced by the time corresponding to the deficient number of packets.

According to the apparatus, the management of aligned units can be realized not by inserting a null packet, but by managing the ATS between the GOPs of a multiplexed stream. Thus, transmission band can be effectively used only by a necessary packet (including a GOP) without transmitting an unnecessary packet. In addition, only valid portions can be stored when a multiplexed stream is stored, thereby efficiently utilizing a storage capacity.

The present invention is not limited to the above-mentioned inter-GOP management apparatus, but also can be configured as an inter-GOP managing method, and as a video record device.

BRIEF DESCRIPTION OF THE DRAWINGS

The present invention will be more clearly described with reference to the later detailed description with the following attached drawings.

BEST MODE FOR CARRYING OUT THE INVENTION

The embodiments of the present invention are described below with reference to the attached drawings.

Figure 1:
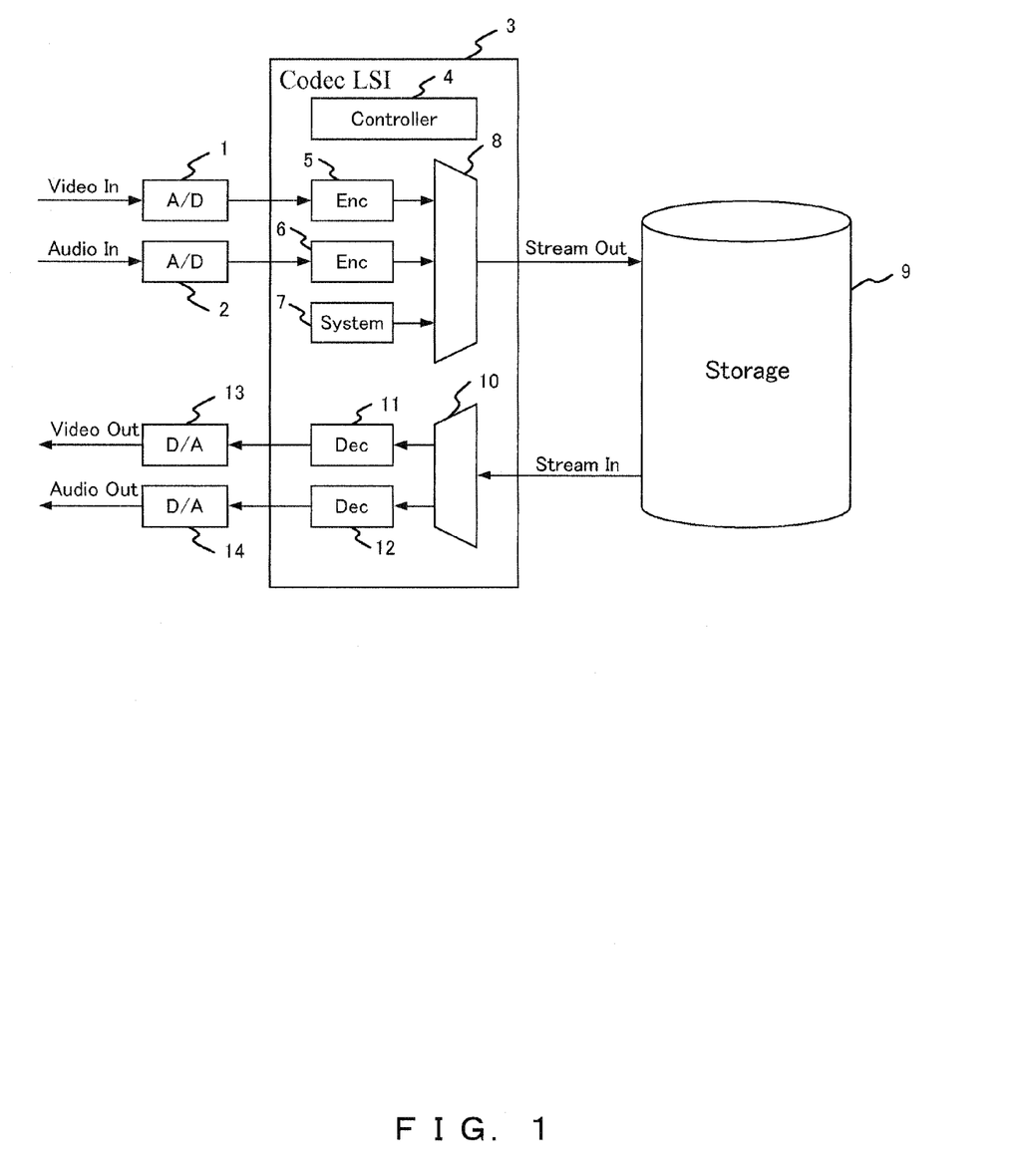
FIG. 1 illustrates the outline of the entire video (moving pictures) record/reproduction device provided with the inter-GOP management apparatus according to an embodiment of the present invention.

FIG. 1 illustrates the outline of the entire video (moving pictures) record/reproduction device provided with the inter-GOP management apparatus according to an embodiment of the present invention. The video record/reproduction device records and regenerates video and audio, and is in conformity with the standard of the BD (Blu-ray Disc) defined by the BDA (Blu-ray Disc Association).

In FIG. 1, an A/D unit 1 is an A/D converter for converting an input analog video signal (Video in) into a digital video signal and outputting the signal. An A/D unit 2 is an A/D converter for converting an input analog audio signal (Audio in) into a digital audio signal and outputting the signal.

A Codec LSI (Large-ScaleIntegration) 3 performs encoding, multiplexing, demultiplexing, and decoding processes. In the Codec LSI 3, a controller 4 is configured by hardware or firmware, and controls the entire operation of the Codec LSI 3. An encoding unit (Enc) 5 encodes an input digital video signal in the MPEG2 format and outputs the signal. An encoding unit (Enc) 6 encodes an input digital audio signal in a predetermined format and outputs the signal. A system packet generation unit (System) 7 generates and outputs a system packet including time information etc. required during decoding and regenerating operations. A multiplexing unit 8 time-division multiplexes the encoded video signal and audio signal with the system packet, and outputs a multiplexed stream.

Storage 9 is a storage device such as a DVD, an SD card, etc., and records a multiplexed stream transmitted (Stream out) from the Codec LSI 3. Since the video record/reproduction device is in conformity with the standard of the BD, 1 packet is configured by 192 bytes and 1 aligned unit is configured by 32 packets (6144 bytes) in the multiplexed stream transmitted from the Codec LSI 3.

In the Codec LSI 3, a demultiplexing unit 10 demultiplexes the multiplexed stream input (Stream in) from the storage 9, and outputs the encoded video signal and audio signal. A decoding unit (Dec) 11 decodes and outputs the encoded video signal. A decoding unit (Dec) 12 decodes and outputs the encoded audio signal.

AD/A unit 13 is a D/A converter for converting the decoded video signal into an analog video signal and outputting (Video out). A D/A unit 14 is a D/A converter for converting the decoded audio signal into an analog audio signal and outputting (Audio out) the signal.

Figure 2:
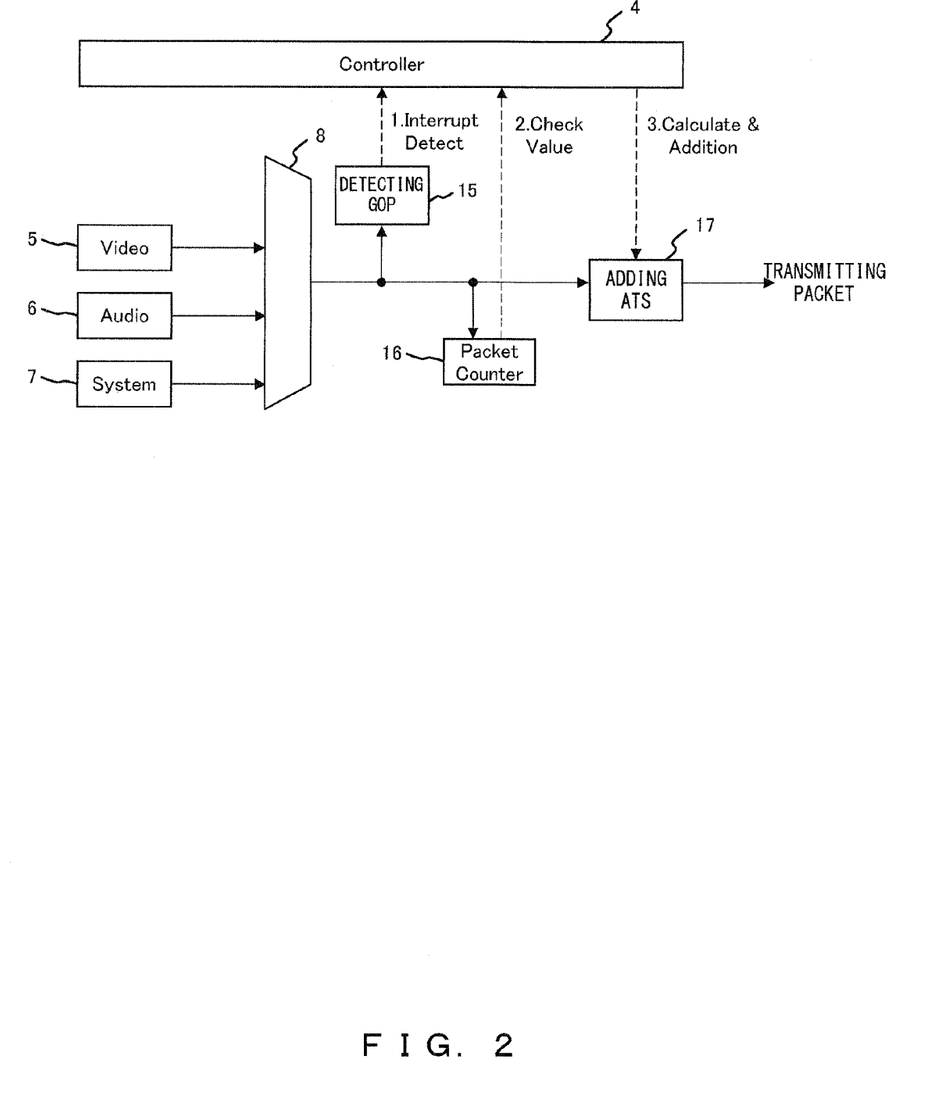
FIG. 2 illustrates in more details the configuration relating to encoding, multiplexing, etc. in a Codec LSI.

FIG. 2 illustrates in more detail the configuration relating to encoding, multiplexing, etc. in the Codec LSI 3.

In FIG. 2, the encoding units 5 and 6, the system packet generation unit 7, the multiplexing unit 8, and the controller 4 are described above. However, in more detail, the encoding unit 5 encodes an input video signal in the MPEG2 format, and generates and outputs a video packet configuring a video stream. The encoding unit 6 encodes an input audio signal in a predetermined format, and generates and outputs an audio packet configuring an audio stream. The multiplexing unit 8 time-division multiplexes the video packet output from the encoding unit 5, the audio packet output from the encoding unit 6, and the system packet output from the system packet generation unit 7, and generates and outputs a multiplexed packet (188 bytes) configuring a multiplexed stream.

Although not illustrated in FIG. 1, a GOP detection unit 15, a packet counter 16, and an ATS addition unit 17 are further provided for the output side of the multiplexing unit 8.

The GOP detection unit 15 monitors a packet output from the multiplexing unit 8, and detects a packet including a GOP. The packet counter 16 counts the number of packets output from the multiplexing unit 8. The ATS (Arrival Time Stamp) addition unit 17 adds transmission time expressed by 4 bytes as an ATS (Arrival Time Stamp) to the header of the packet output from the multiplexing unit 8, and outputs a 192-byte packet configuring a multiplexed stream (transmitting a packet). The transmission time added as an ATS is a counter value of the time counter provided for the controller 4. The multiplexed stream configured by the packet to which the ATS is added is stored in the storage 9 as described above.

With the above-mentioned configuration, the controller 4 first starts the output of a packet including the first GOP (for example, "GOP#M") from the multiplexing unit 8 by controlling the encoding units 5 and 6, the system packet generation unit 7, and the multiplexing unit 8. If it is determined (1. Interrupt Detect) that the packet including the GOP#M is not detected any more on the basis of the detection result of the GOP detection unit 15 for monitoring a packet output from the multiplexing unit 8, then the counter value (Packet Counter Value) of the packet counter 16 at the time is confirmed (2. Check Value), and it is determined whether or not the packets including the GOP#M have terminated without reaching the number of packets (packets of a multiple of 32) in aligned units. In this determination, if the value of the packet counter value mod 32 is any other than 0, then it is determined that the packets including the GOP#M have terminated without reaching the number of packets in aligned units.

The packet counter 16 is configured so that, for example, the counter value can be reset to 0 immediately before the packet including the header of a GOP is output from the multiplexing unit 8, and the counter value can be set to 1 for the packet including the header of the GOP.

If it is determined that the packets including the GOP#M have terminated without reaching the number of packets in aligned units, then the amount of counting of the time counter corresponding to the deficient number of packets is obtained by a calculation, the obtained value is added to the counter value of the time counter, and the time counter is advanced (3. Calculate & Addition). That is, if the determination is made as described above, the transmission time added as an ATS is advanced by the time corresponding to the deficient number of packets. The calculation of the amount of counting of the time counter corresponding to the deficient number of packets can be performed using a predetermined packet multiplexing interval, a video recording rate, etc.

While the time counter is thus advanced, the encoding units 5 and 6, the system packet generation unit 7, and the multiplexing unit 8 are controlled to start outputting the packet including the next GOP#N (for example, "GOP#N") from the multiplexing unit 8. Thus, the advanced counter value of the time counter is added as an ATS to the packet including the GOP#N.

If it is determined in the determination above that the packets including the GOP#M have terminated by the number of packets in aligned units, then the time counter is not advanced as described above, but the encoding units 5 and 6, the system packet generation unit 7, and the multiplexing unit 8 are simply controlled to start outputting the packet including the next GOP#N from the multiplexing unit 8.

Similar processes are performed in the subsequent steps.

By repeating the above-mentioned operations, when the controller 4 determines from the detection result of the GOP detection unit 15 and the counter value of the packet counter 16 that the packets including a GOP have terminated without reaching the number of packets in aligned units, the time counter is advanced by the value corresponding to the deficient number of packets, and the output of the packet including the next GOP from the multiplexing unit 8 is started.

Figure 3:
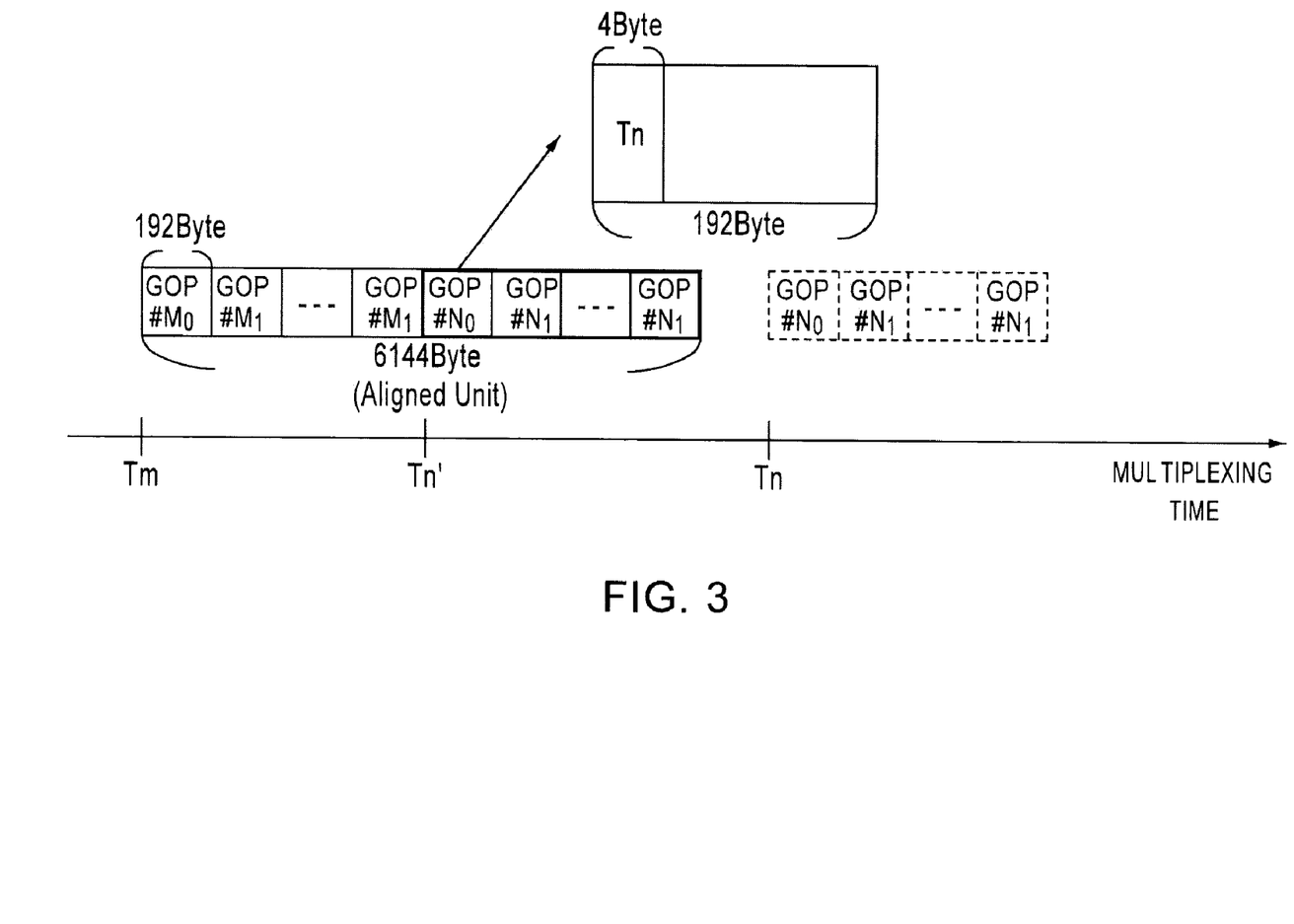
FIG. 3 is a schematic diagram of a packet transmitted from a Codec LSI.

FIG. 3 is a schematic diagram of a packet transmitted from the Codec LSI 3 as described above.

In FIG. 3, when the packets (GOP#$M_0$, . . . , GOP#$M_i$) including the transmitted GOP#M terminate without reaching 1 aligned unit, the conventional device first complements the deficiency to fill the 1 aligned unit with null packets, and then transmits the packets (GOP#$M_0$, . . . , GOP#$M_i$) including the next GOP#N as indicated by the dotted lines illustrated in FIG. 3. In this case, the transmission time Tn is added as an ATS to the packet (GOP#$N_0$) including the header of the next GOP#N. On the other hand, according to the apparatus of the present embodiment, null packets are not transmitted in this case, but the packets (GOP#$N_0$, . . . , GOP#$N_j$) including the next GOP#N are transmitted as illustrated in FIG. 3. However, the transmission time virtually advanced by the time counter advanced as described above is embedded as an ATS to the packet including the GOP#N and transmitted. Thus, not the actual transmission time Tn', but the virtually advanced transmission time Tn is embedded to the packet (GOP#$N_0$) including the header of the GOP#N. Thus, it is assumed that the packet (GOP#$N_0$) including the header of the GOP#N has been virtually transmitted with the transmission time Tn.

As described above, the apparatus according to the present embodiment does not transmit a null packet, but transmits only valid packets. Therefore, packets can be transmitted by efficiently utilizing the bands.

Figure 4:
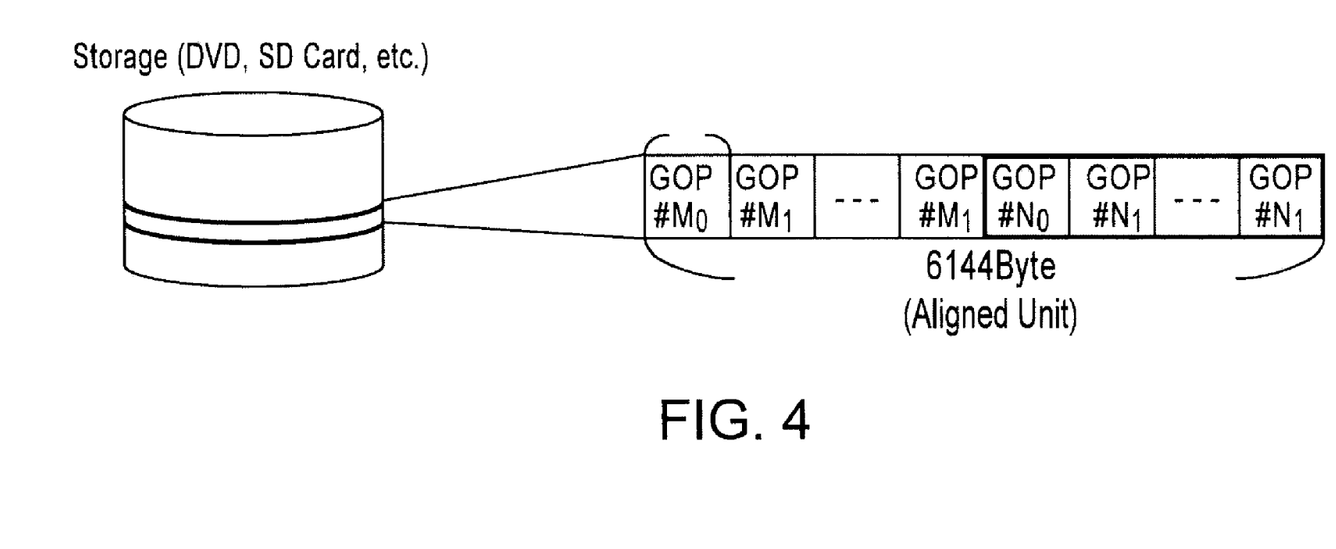
FIG. 4 is a schematic diagram of an example of storing a packet transmitted from a Codec LSI in storage.

FIG. 4 is a schematic diagram of an example of storing a packet transmitted from the Codec LSI 3 in the storage 9.

As illustrated in FIG. 4, when a packet transmitted from the Codec LSI 3 is stored in the storage 9 for each aligned unit, only valid packets are transmitted in aligned units without transmitting null packets. Therefore, no areas store null data, but only valid data is stored without waste. In addition, an added ATS can clearly indicate the position of the next GOP, and the ATS is added to start the header of the GOP from the header of an aligned unit. Therefore, each GOP can be easily managed.

As described above, according to the present embodiment, the management of aligned units can be realized not by inserting a null packet, but by managing the ATS between the GOPs of a multiplexed stream. Thus, the transmission band can be efficiently used for necessary packets without transmitting unnecessary packets. Additionally, only valid portions can be stored when a multiplexed stream is stored, thereby efficiently utilizing a storage capacity.

The present invention is described above in detail, but is not limited to the above-mentioned embodiments, and can be improved and varied within the scope of the gist of the present invention.

According to the present invention, the management of aligned units can be realized not by inserting a null packet, but by managing the ATS between the GOPs of a multiplexed stream. Thus, the transmission band can be efficiently used for necessary packets without transmitting unnecessary packets. Additionally, only valid portions can be stored when a multiplexed stream is stored, thereby efficiently utilizing a storage capacity.

The invention claimed is:

1. An inter-GOP (Group Of Picture) management apparatus which performs inter-GOP management in a multiplexed stream managed in certain packet units, the apparatus comprising:
   a GOP detection unit that monitors a multiplexed packet output by encoding and multiplexing to detect a multiplexed packet including a first GOP identifier;
   a count unit that counts a number of multiplexed packets including the first GOP identifier; and
   an ATS addition unit that adds an ATS (Arrival Time Stamp) to the multiplexed packet output by the encoding and multiplexing, wherein
   when the number of the multiplexed packets including the first GOP identifier is smaller than a number of packets in the certain packet units, time added as the ATS to a multiplexed packet including a second GOP identifier is advanced by time corresponding to a deficient number of packets among the number of packets in the certain packet units.

2. The apparatus according to claim 1, wherein
   after the time added as the ATS is advanced, outputting the multiplexed packet including the second GOP identifier is started by the encoding and multiplexing.

3. The apparatus according to claim 1, further comprising
   a determination unit that determines whether or not the number of the multiplexed packets including the first GOP identifier is smaller than the number of packets in the certain packet units based on a detection result of the GOP detection unit and a counting result of the count unit.

4. The apparatus according to claim 3, wherein
   the determination unit determines whether or not the number of the multiplexed packets including the first GOP identifier is smaller than the number of packets in the certain packet units depending on the number counted by the count unit when the GOP detection unit does not detect the multiplexed packet including the first GOP identifier any more.

5. A video record device which encodes and multiplexes an input video signal and audio signal, and records a resultant signal, the device comprising:
   a GOP (Group Of Picture) detection unit that monitors a multiplexed packet output by encoding and multiplexing to detect a multiplexed packet including a first GOP identifier;
   a count unit that counts a number of multiplexed packets including the first GOP identifier;
   an ATS addition unit that adds an ATS (Arrival Time Stamp) to the multiplexed packet output by the encoding and multiplexing; and
   a record unit that records a multiplexed stream configured by a multiplexed packet to which an ATS is added by the ATS addition unit, wherein
   when the number of the multiplexed packets including the first GOP identifier is smaller than a number of packets in a certain packet units, time added as the ATS to a multiplexed packet including a second GOP identifier is advanced by time corresponding to a deficient number of packets among the number of packets in the certain packet units.

6. The device according to claim 5, wherein
   after the time added as the ATS is advanced, outputting the multiplexed packet including the second GOP identifier is started by the encoding and multiplexing.

7. The device according to claim 5, further comprising
   a determination unit that determines whether or not the number of the multiplexed packets including the first GOP identifier is smaller than the number of packets in the certain packet units based on a detection result of the GOP detection unit and a counting result of the count unit.

8. The device according to claim 7, wherein
   the determination unit determines whether or not the number of the multiplexed packets including the first GOP identifier is smaller than the number of packets in the certain packet units depending on the number counted by the count unit when the GOP detection unit does not detect the multiplexed packet including the first GOP identifier any more.

9. An inter-GOP (Group Of Picture) managing method for performing inter-GOP management in a multiplexed stream managed in certain packet units, the method comprising:
   monitoring a multiplexed packet output by encoding and multiplexing; and
   adding an ATS (Arrival Time Stamp) to the multiplexed packet output by the encoding and multiplexing, wherein
   when the number of multiplexed packets including a first GOP identifier is smaller than a number of packets in the certain packet units, time added as the ATS to a multiplexed packet including a second GOP identifier is advanced by time corresponding to a deficient number of packets among the number of packets in the certain packet units.

10. The method according to claim 9, wherein
    after the time added as the ATS is advanced, outputting the multiplexed packet including the second GOP identifier is started by the encoding and multiplexing.

11. The method according to claim 9, wherein
    it is determined whether or not the number of the multiplexed packets including the first GOP identifier is smaller than the number of packets in the certain packet units based on a detection result of detecting the multiplexed packets including the first GOP identifier by the monitoring the multiplexed packet and a counting result of counting the number of the multiplexed packets including the first GOP identifier.

12. The method according to claim 11, wherein
it is determined whether or not the number of the multiplexed packets including the first GOP identifier is smaller than the number of packets in the certain packet units depending on the counted number when the multiplexed packet including the first GOP identifier is not detected any more.

13. The method according to claim 9, wherein
a multiplexed stream configured by a multiplexed packet to which the ATS is added is recorded.

* * * * *